US008450666B2

(12) United States Patent
Yang et al.

(10) Patent No.: US 8,450,666 B2
(45) Date of Patent: May 28, 2013

(54) HIGH-EFFICIENCY WATER BOILING DEVICE

(76) Inventors: Shun-Chi Yang, Kaohsiung (TW); Mao-Hsiung Yang, Kaohsiung (TW); Tsung-Chuan Yang, Kaohsiung (TW); Fang-Ming Wu, Kaohsiung (TW); Cheng-Yen Wu, Kaohsiung (TW)

( * ) Notice: Subject to any disclaimer, the term of this patent is extended or adjusted under 35 U.S.C. 154(b) by 370 days.

(21) Appl. No.: 12/879,055

(22) Filed: Sep. 10, 2010

(65) Prior Publication Data

US 2012/0061382 A1 Mar. 15, 2012

(51) Int. Cl.

| | |
|---|---|
| ***B23K 11/10*** | (2006.01) |
| ***H05B 3/78*** | (2006.01) |
| ***F24H 1/10*** | (2006.01) |
| ***B67D 7/80*** | (2010.01) |
| ***F24H 1/08*** | (2006.01) |
| ***F24C 1/14*** | (2006.01) |

(52) U.S. Cl.

USPC ........... 219/628; 219/629; 219/630; 219/631; 219/607; 392/450; 392/308; 392/465; 392/466; 392/467; 392/468; 392/469; 392/470; 392/471; 392/472; 392/473; 392/474; 392/475; 392/476; 392/477; 392/478; 392/479; 392/480; 392/481; 392/482; 392/483; 392/484; 392/485; 392/486; 392/487; 392/488; 392/489; 392/490; 392/491; 392/492; 392/493; 392/494; 237/19; 122/18.1; 122/19.2

(58) Field of Classification Search

USPC .......... 219/628–631, 607; 392/308, 465–494, 392/449–459; 237/19; 122/18.1, 19.2

See application file for complete search history.

(56) References Cited

U.S. PATENT DOCUMENTS 5,523,550 A * 6/1996 Kimura ......................... 219/772
7,039,305 B1 * 5/2006 Chen ............................. 392/490

* cited by examiner

*Primary Examiner* — Sang Paik
*Assistant Examiner* — Renee L Miller
(74) *Attorney, Agent, or Firm* — Alan Kamrath; Kamrath IP Lawfirm, P.A.

(57) ABSTRACT

A water boiling device includes a heat tank unit received in a machine body, a high frequency induction heater, and a heat pipe unit. The heat tank unit includes first and second heating tanks in communication with each other. Outside water can flow into the first and second heating tanks. The high frequency induction heater includes a heat pipe induction coil and first and second induction coils. The heat pipe unit includes first and second heating pipes. An upper section of each heating pipe is received in one of the heating tanks, and a lower section of each heating pipe extends out of the heating tanks and is inserted into the heat pipe induction coil. The first and second heating tanks will heat up to heat the water in the first and second heating tanks when a high frequency current is passed through the heat pipe induction coil and first and second induction coils.

8 Claims, 3 Drawing Sheets

HIGH-EFFICIENCY WATER BOILING DEVICE

BACKGROUND OF THE INVENTION

1. Field of the Invention

The present invention relates to a water boiling device and, more particularly, to a water boiling device using high-frequency heating.

2. Description of the Related Art

A water boiler operated on gas, natural gas or diesel is often used in a school, hospital, hotel, office, factory, military camp or the like to provide water for drinking or washing. However, there is always a risk of incomplete combustion that leads to the production of lethal carbon monoxide. Furthermore, using electric energy for heating, there is the possibility of high power consumption and slow heating rate.

Thus, a fast heating, energy saving, quite safe water boiler is required.

BRIEF SUMMARY OF THE INVENTION

Therefore, it is an objective of the present invention to overcome the aforementioned shortcoming and deficiency of the prior art by providing a water boiling device that utilizes high frequency induction heating to heat cold water and has advantages such as high heating efficiency, power saving, and high utilization safety.

To achieve the foregoing objective, a water boiling device of the present invention includes a machine body, a heat tank unit, and a high frequency induction heater. The heat tank unit is received in the machine body and includes first and second heating tanks spaced in a horizontal direction. The first heating tank is in communication with the second heating tank and adapted for containing water from a water inlet pipe so that water to be heated can be supplied to the first and second heating tanks through the water inlet pipe. The high frequency induction heater includes a high frequency power, a first induction coil, and a second induction coil. The first and second induction coils are respectively disposed around the first and second heating tanks and electrically connected to the high frequency power so that the first and second heating tanks will heat up to heat the water in the first and second heating tanks when a high frequency current supplied by the high frequency power is passed through the first and second induction coils.

In a preferred form, the water boiling device further includes a heat pipe unit having first and second heating pipes. Each of the first and second heating pipes includes upper and lower sections spaced in a vertical direction perpendicular to the horizontal direction. The high frequency induction heater further includes a heat pipe induction coil electrically connected to the high frequency power. The upper section of each of the first and second heating pipes is received in one of the first and second heating tanks. The lower section of each of the first and second heating pipes is located out of the first and second heating tanks and received in the heat pipe induction coil. The first and second heating pipes will heat up to heat the water in the first and second heating tanks when the high frequency current is passed through the heat pipe induction coil.

Preferably, each of the first and second heating pipes is filled with heat conduction liquid, and the upper section of each of the first and second heating pipes is provided with a plurality of heat transmission fins. The heat pipe induction coil includes first and second coil segments. The lower section of each of the first and second heating pipes is received in one of the first and second coil segments of the heat pipe induction coil.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

Figure 1:
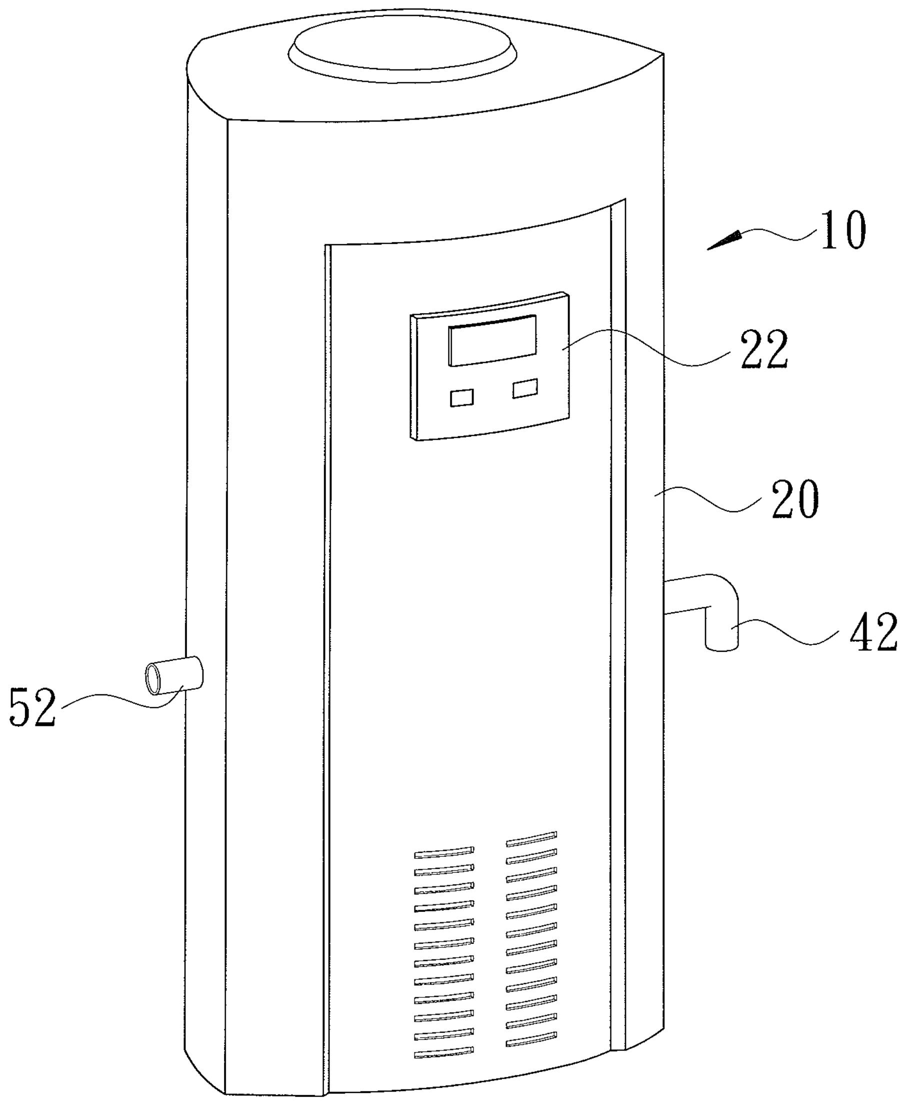
FIG. 1 shows a schematically perspective view of a water boiling device according to a first embodiment of the present invention.
Figure 2:
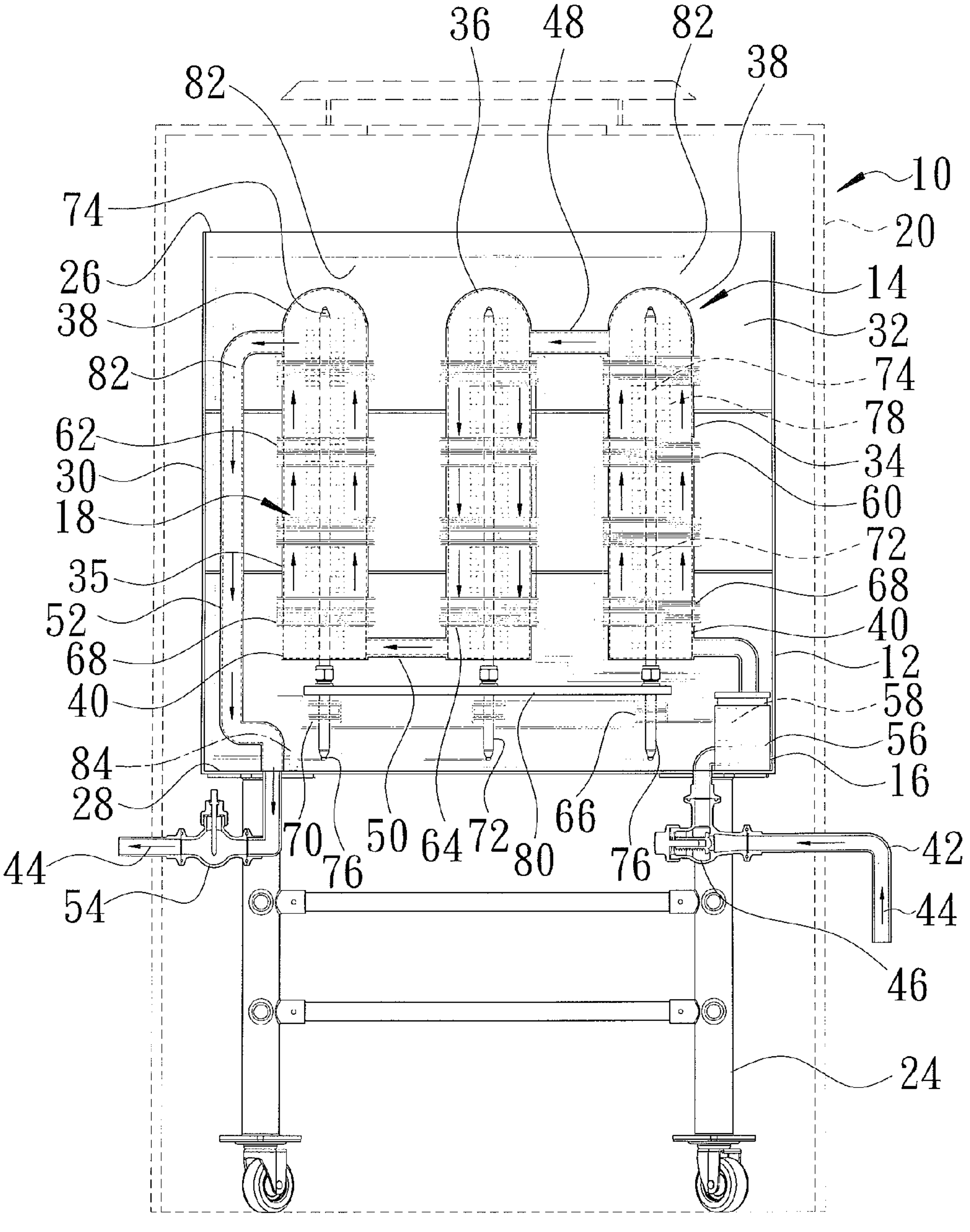
FIG. 2 shows a schematically structural view of the water boiling device of FIG. 1.

A high efficiency water boiling device of a first embodiment of the present invention is shown in FIGS. 1 and 2 of the drawings and generally designated 10. The water boiling device 10 includes a machine body 12, a heat tank unit 14, a high frequency induction heater 16, and a heat pipe unit 18. The machine body 12 is received in an outer shell 20. On the outer shell 20, a man-machine interface (operation panel) 22 is provided for users to do settings and/or read the temperature of the hot water. A support frame 24 is provided below the machine body 12 to support the machine body 12. In this embodiment, the machine body 12 includes a top plate 26, a bottom plate 28, and a side plate 30 located between the top plate 26 and the bottom plate 28 and defining a periphery of the machine body 12. The machine body 12 includes a receiving space 32 therein.

Heat tank unit 14 is received in the receiving space 32 of the machine body 12 and includes a plurality of heating tanks spaced in a horizontal direction. In this embodiment, the heat tank unit 14 includes a first heating tank 34, a second heating tank 35, and an intermediate heating tank 36 located between the first and second heating tanks 34 and 35. In this embodiment, each heating tank 34, 35, 36 is a metallic cylinder and includes upper and lower ends 38 and 40 spaced in a vertical direction perpendicular to the horizontal direction. A water inlet pipe 42 is connected to the lower end 40 of the first heating tank 34, and one end of the water inlet pipe 42 is connected to a water storage device such as a water tower (not shown) so that water 44 (as pointed by an arrow) to be heated can be supplied to the first heating tank 34. Further, a check valve 46 is provided on the water inlet pipe 42 to avoid the reverse flow of water 44 in the first heating tank 34. The upper end 38 of the intermediate heating tank 36 is in communication with the upper end 38 of the first heating tank 34 by a first pipe 48, allowing water 44 in the first heating tank 34 flowing into the intermediate heating tank 36 when the level of water 44 in the first heating tank 34 reaches the height of the first pipe 48. Intermediate heating tank 36 is in communication with the second heating tank 35 by a second pipe 50 so that water 44 in the intermediate heating tank 36 can, through the second pipe 50, flow into the second heating tank 35. Moreover, a water outlet pipe 52 is connected to the second heating tank 35 so that water 44 in the second heating tank 35 can be sent out. One end of the water outlet pipe 52 extends out of the machine body 12 and is provided with a water outlet valve 54.

It can be appreciated that the heat tank unit 14 may only include a first heating tank 34 and a second heating tank 35.

High frequency induction heater 16 includes a main body 56, a high frequency power 58 installed in the main body 56, and a plurality of induction coils. In this embodiment, the high frequency induction heater 16 includes a first induction coil 60, a second induction coil 62, an intermediate induction coil 64, and a heat pipe induction coil 66. Water inlet pipe 42 extends through the main body 56 so that the heat generated by the high frequency induction heater 16 can be absorbed and dissipated by water 44 flowing through the water inlet pipe 42, and that water 44 can be also preheated. Each induction coil 60, 62, 64, 66 is electrically connected to the high frequency power 58. The power of the high frequency power 58 can be powered by a general city power or by a solar energy power generator. High frequency power 58 can be controlled to provide high frequency current to each induction coil 60, 62, 64, 66.

Each of first, second, and intermediate induction coils 60, 62, and 64 includes a plurality of helix-shape coil segments 68 spaced in the vertical direction and disposed around one of the first, second, and intermediate heating tanks 34, 35 and 36. Thus, when high frequency power 58 supplies high frequency current to the first, second, and intermediate induction coil 60, 62, 64, the first, second, and intermediate heating tanks 34, 35, and 36 will get induction and uniform heating. Further, the heating pipe induction coil 66 includes a plurality of helix-shape coil segments 70 spaced in the horizontal direction and aligned with lower ends of the first, second, and intermediate heating tanks 34, 35 and 36 respectively.

In the preferred form shown, the heat pipe unit 18 includes three heating pipes 72. Each heating pipe 72 is a metallic pipe filled with heat conduction liquid and includes upper and lower sections 74 and 76 spaced in the vertical direction. The upper section 74 of each heating pipe 72 is provided with a plurality of heat transmission fins 78 and received in one of the first, second, and intermediate heating tanks 34, 35, and 36. The lower section 76 of each heating pipe 72 is out of an associated heating tank and mounted to a support seat 80 to be supported and positioned. Further, the lower section 76 of each heating pipe 72 is received in one of the coil segments 70 of the heating pipe induction coil 66 so that each heating pipe 72 can momentarily heat up by the eddy current generated from the heating pipe induction coil 66.

In operation of the water boiling device 10, water 44 to be heated firstly flows from the water inlet pipe 42 to the first heating tank 34 and, then, through the first pipe 48, the intermediate heating tank 36, and the second pipe 50 in sequence into the second heating tank 35. When the high frequency induction heater 16 operates and high frequency current is supplied to each induction coil 60, 62, 64, 66, each induction coil 60, 62, 64, 66 can induce each heating tank 34, 35, 36 and the heating pipe 72 to generate an eddy current for heating up. When temperature of the heating tanks 34, 35, 36 is raised, water 44 in the heating tanks 34, 35, 36 will be heated. Further, when the temperature of the heating pipes 72 is raised, the water 44 in the heating tanks 34, 35, 36 will be also heated. Thus, water 44 in the heating tanks 34, 35, 36 can be rapidly heated to form hot water.

In the embodiment, water boiling device 10 further includes a plurality of temperature detectors 82 electrically connected to a temperature control device 84. Each temperature detector 82 is inserted into one of the heating tanks 34, 35, 36 and the water outlet pipe 52 to detect the temperature of water 44 in each heating tank 34, 35, 36 and to detect the temperature of hot water 44 outputted from the water outlet pipe 52. Furthermore, the lower section 76 of each heating pipe 72 is also electrically connected to the temperature control device 84 so that the temperature of each heating pipe 72 can be detected. Thus, the temperature control device 84 can follow the temperature of water 44 in the heating tanks 34, 35, 36 and temperature of each heating pipe 72 to control individually on-off of each induction coil 60, 62, 64, 66 of the high frequency induction heater 16 and the current intensity of high frequency. Further, based on the temperature of water 44 in heating tank 34, 35, 36 and the temperature of each heating pipe 72, independent activation or all activation of induction coils 60, 62, 64, 66 can then be controlled so that the hot water 44 outputted from the water outlet pipe 52 may reach a determined temperature.

High frequency induction heater 16 of the water boiling device 10 according to this invention can utilize a small current to rapidly the heat heating tanks 34, 35, 36 and the heating pipes 72 to a high temperature ranging between 100 and 1000 degrees. Meanwhile, the high temperature of the heating tanks 34, 35, 36 and the heating pipes 72 will be rapidly transmitted to water 44 in the heating tanks 34, 35, 36 for rapid heating. Since the power consumed is small and there is no danger of general gas, it thus has advantages such as power saving, energy saving and carbon reduction as well as high safety. Furthermore, through the independent heating control of each induction coil 60, 62, 64, 66, the hot water 44 outputted from the water outlet pipe 52 can be accurately controlled for its temperature. Further, in the structure of the water boiling device 10, pipes of small or large diameter may be used to reduce the length of piping and lower the volume, which advantageously save materials and does not occupy space.

Figure 3:
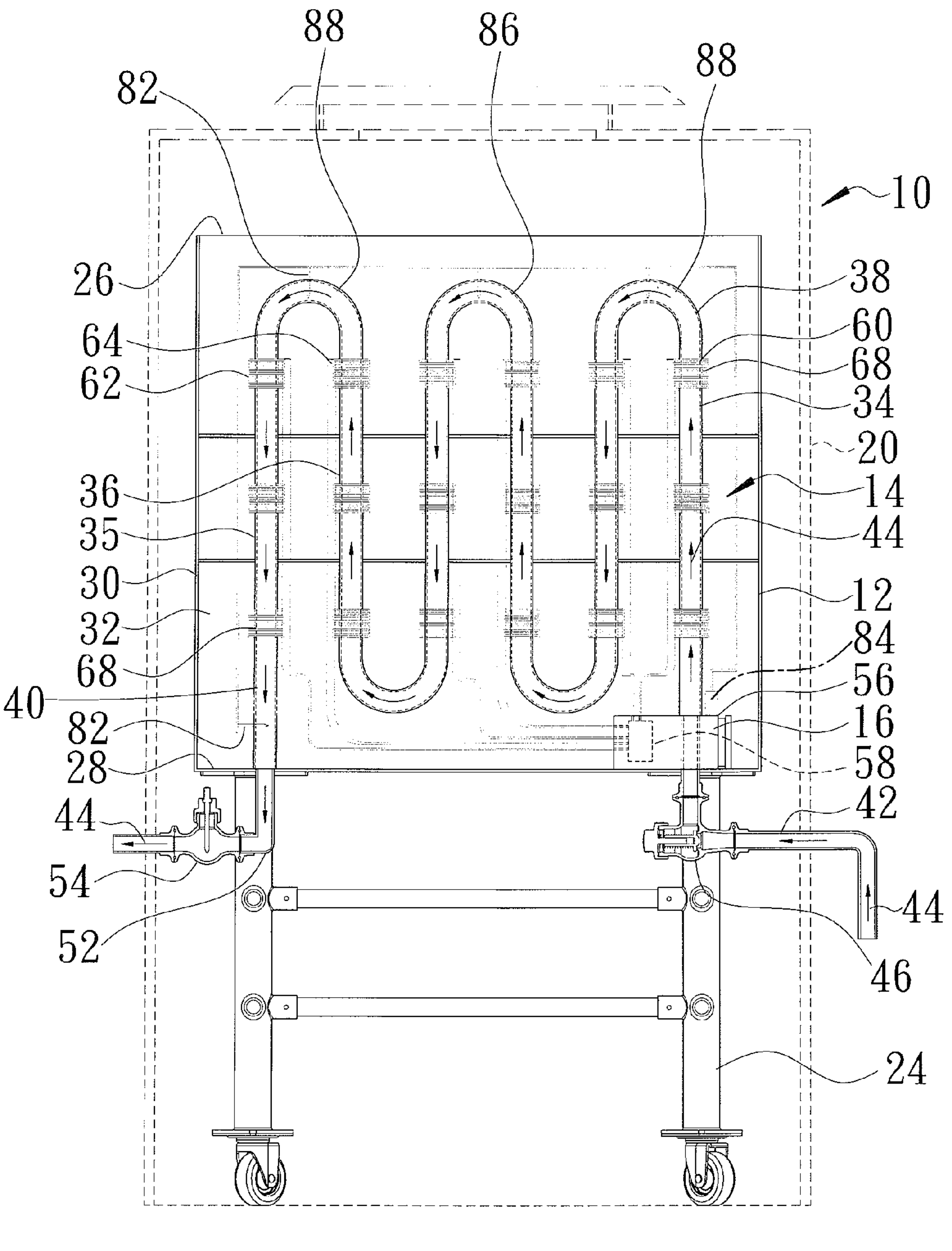
FIG. 3 shows a schematically structural view of a water boiling device according to a second embodiment of the present invention.

Now that the basic teachings of the present invention have been explained, many extensions and variations will be obvious to one having ordinary skill in the art. FIG. 3 shows a water boiling device 10 of a second embodiment of this invention. Description of the parts of the water boiling device 10 shown in FIG. 3 identical to those shown in FIG. 2 is omitted. In particular, the water boiling device 10 in this embodiment does not contain the heat pipe unit 18 but only includes the machine body 12, the heat tank unit 14, and the high frequency induction heater 16. Heat tank unit 14 includes a plurality of intermediate heating tanks 36 located between the first and second heating tanks 34 and 35. In this embodiment, each heating tank 34, 35, 36 is a metallic tube and includes upper and lower ends 38 and 40 spaced in the vertical direction. Intermediate heating tanks 36 are spaced in the horizontal direction and connected to each other with pipes 86. Further, two of the intermediate heating tanks 36 are respectively connected to the first and second heating tanks 34, and 35 by connection pipes 88 so that water 44 in the first heating tank 34 can flow into the second heating tank 35 through the intermediate heating tanks 36. Further, the high frequency induction heater 16 includes a first induction coil 60, a second induction coil 62, and a plurality of intermediate induction coils 64. Each of first, second, and intermediate induction coils 60, 62, 64 includes a plurality of helix-shape coil segments 68 spaced in the vertical direction and disposed around one of the first, second, and intermediate heating tanks 34, 35 and 36. Thus, when high frequency power 58 supplies high frequency current to the first, second, and intermediate induction coils 60, 62, 64, the first, second and intermediate heating tanks 34, 35, 36 will get the induction and heat up momentarily.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A water boiling device comprising, in combination:

a machine body;

a heat tank unit received in the machine body and including first and second heating tanks spaced in a horizontal direction, with the first heating tank in communication with the second heating tank and adapted for containing water from a water inlet pipe with water to be heated supplied to the first and second heating tanks through the water inlet pipe;

a high frequency induction heater including a high frequency power and first and second induction coils, with the first and second induction coils respectively disposed around the first and second heating tanks, with the first and second induction coils electrically connected to the high frequency power with the first and second heating tanks heating up to heat the water in the first and second heating tanks when a high frequency current supplied by the high frequency power is passed through the first and second induction coils; and a heat pipe unit including first and second heating pipes, with each of the first and second heating pipes including upper and lower sections spaced in a vertical direction perpendicular to the horizontal direction, with the high frequency induction heater further including a heat pipe induction coil electrically connected to the high frequency power, with the upper section of each of the first and second heating pipes received in one of the first and second heating tanks, with the lower section of each of the first and second heating pipes located out of the first and second heating tanks and received in the heat pipe induction coil, and with the first and second heating pipes heating up to heat the water in the first and second heating tanks when the high frequency current is passed through the heat pipe induction coil.

2. The water boiling device according to claim 1, with each of the first and second heating pipes filled with heat conduction liquid, with the upper section of each of the first and second heating pipes provided with a plurality of heat transmission fins, with the heat pipe induction coil including first and second coil segments, and with the lower section of each of the first and second heating pipes received in one of the first and second coil segments of the heat pipe induction coil.

3. The water boiling device according to claim 2, with the high frequency induction heater further including a main body receiving the high frequency power, and with the water inlet pipe extending through the main body.

4. The water boiling device according to claim 3, with the heat tank unit further including an intermediate heating tank located between and in communication with the first and second heating tanks, with the high frequency induction heater further including an intermediate induction coil disposed around the intermediate heating tank, and with the intermediate induction coil electrically connected to the high frequency power.

5. The water boiling device according to claim 4, with each of the first, second, and intermediate induction coils including a plurality of coil segments spaced in the vertical direction and disposed around one of the first, second, and intermediate heating tanks.

6. The water boiling device according to claim 1, with the high frequency induction heater further including a main body receiving the high frequency power, and with the water inlet pipe extending through the main body.

7. The water boiling device according to claim 6, with the heat tank unit further including an intermediate heating tank located between and in communication with the first and second heating tanks, with the high frequency induction heater further including an intermediate induction coil disposed around the intermediate heating tank, and with the intermediate induction coil electrically connected to the high frequency power.

8. The water boiling device according to claim 7, with each of the first, second, and intermediate induction coils including a plurality of coil segments spaced in the vertical direction and disposed around one of the first, second, and intermediate heating tanks.

* * * * *